(12) United States Patent
Jin

(10) Patent No.: US 8,217,956 B1
(45) Date of Patent: Jul. 10, 2012

(54) METHOD AND APPARATUS FOR RENDERING SPHERICAL PANORAMAS

(75) Inventor: Hailin Jin, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 819 days.

(21) Appl. No.: 12/040,504

(22) Filed: Feb. 29, 2008

(51) Int. Cl.
*G09G 5/00* (2006.01)
(52) U.S. Cl. ........................................ 345/585
(58) Field of Classification Search ............ 345/585, 345/419, 420, 649, 653
See application file for complete search history.

(56) References Cited

U.S. PATENT DOCUMENTS

| | | | |
|---|---|---|---|
| 6,157,747 A * | 12/2000 | Szeliski et al. ............... | 382/284 |
| 6,486,908 B1 | 11/2002 | Chen et al. | |
| 6,764,233 B2 * | 7/2004 | Bean et al. ..................... | 400/61 |
| 7,006,707 B2 | 2/2006 | Peterson | |
| 7,103,236 B2 | 9/2006 | Peterson | |
| 7,317,473 B2 | 1/2008 | Chen et al. | |
| 7,623,623 B2 * | 11/2009 | Raanes et al. .................. | 378/65 |
| 2008/0074500 A1 | 3/2008 | Chen et al. | |
| 2008/0144973 A1 | 6/2008 | Jin | |

* cited by examiner

*Primary Examiner* — Said Broome
*Assistant Examiner* — Janice Kau
(74) *Attorney, Agent, or Firm* — Robert C. Kowert; Meyertons, Hood, Kivlin, Kowert & Goetzel, P.C.

(57) ABSTRACT

Method and apparatus for rendering panoramas under spherical projections. A set of component images and alignment parameters for the images are obtained. A rotation matrix for a component image is decomposed into three rotation matrices. An in-plane rotation of the image is performed to generate a rotated image. Once an in-plane rotation is performed, the rotated image is rendered first in one planar (x or y) dimension (whether columns or rows) to generate an intermediate image, and then the intermediate image is rendered in the other planar dimension to generate an output image. Decimation of the input rows and columns may be performed if necessary, and one-dimensional interpolation may be performed to generate pixel values in the output rows and columns from pixel values in the input rows and columns. The output image may be adjusted on the spherical projection by shifting the bounding box of the output image.

20 Claims, 7 Drawing Sheets

METHOD AND APPARATUS FOR RENDERING SPHERICAL PANORAMAS

BACKGROUND

1. Field of the Invention

This invention relates to computer systems, specifically to computer-aided image processing, and more specifically to rendering spherical panoramic images from sets of component images.

2. Description of the Related Art

Image capture devices, such as cameras, may be used to capture an image of a section of a view or scene, such as a section of the front of a house. The section of the view or scene whose image is captured by a camera is known as the field of view of the camera. Adjusting a lens associated with a camera may increase the field of view. However, there is a limit beyond which the field of view of the camera cannot be increased without compromising the quality, or "resolution", of the captured image. Further, some scenes or views may be too large to capture as one image with a given camera at any setting. Thus, it is sometimes necessary to capture an image of a view that is larger than can be captured within the field of view of a camera. In these instances, multiple overlapping images of segments of the view or scene may be taken, and then these component images may be joined together, or merged, to form a composite image.

One type of composite image is known as a panoramic image. A panoramic image may have a rightmost and leftmost image that each overlap only one other image, or alternatively the images may complete 360°, where all images overlap at least two other images. In the simplest type of panoramic image, there is one row of images, with each image at most overlapping two other images. However, more complex composite images may be captured that have two or more rows of images; in these composite images, each image may potentially overlap more than two other images. For example, a motorized camera may be configured to scan a scene according to an M×N grid, capturing an image at each position in the grid. Other geometries of composite images may be captured.

Computer programs and algorithms exist for assembling a single composite image from multiple potentially overlapping component images. A general paradigm for automatic image stitching techniques is to first detect features in individual images; second, to establish feature correspondences between pairs of images (pairwise stage); and third, to use the feature correspondences to infer the geometric relationship among all the images (multi-image stage).

One technique for forming a composite image from aligned component images projects the images onto a sphere, i.e., generates a "spherical projection". Focal length, image center, image distortion (if any), and camera orientation may be determined for each image and used to map the image onto a sphere. For example, the orientation of the camera can be represented as a set of rotation angles (e.g., described by a 3×3 rotation matrix) from a reference orientation. The spherically mapped component images have less distortion than images mapped directly onto a plane. The spherical image can be unwrapped to derive a planar composite image, for example to print the composite image.

The composite image may be further processed to blend the seams of the overlapping component images. For example, pixel values along the seams of the overlapping component images can be modified to provide a smooth transition between the images.

SUMMARY

Various embodiments of a method and apparatus for rendering panoramas under spherical projections are described. Embodiments may provide a computer-implemented method for performing a rendering portion of a process of assembling a single, spherical composite image from multiple potentially overlapping component images. The computer-implemented method for rendering panoramas under spherical projections may be referred to as a spherical panorama rendering algorithm, which may be implemented in software on a computer in a spherical panorama rendering module. The spherical panorama rendering module may be implemented in various computer-implemented image processing and/or editing applications, programs, or libraries to render panoramas under spherical projections from sets of multiple input or component images. Exemplary software programs in which embodiments may be implemented include, but are not limited to, Adobe® Photoshop®, Adobe Photoshop Elements®, and Adobe Photoshop Lightroom®, and Adobe Premiere®.

In one embodiment, a set of component digital images and image alignment parameters for the component images are obtained. The image alignment parameters may include, but are not limited to, focal length, image center, image distortion (if any), and camera orientation for each image. The camera orientation may, for example, be represented as a set of rotation angles (e.g., described by a 3×3 rotation matrix R) from a reference orientation or position. Given a rotation matrix R for a component image, R may be decomposed into three rotation matrices. An in-plane rotation of the original image may be performed according to one of the three rotation matrices to generate a rotated image. After the rotated image is generated, one row of pixels in the rotated image may be rendered at a time, iteratively rendering every row of the rotated image, to generate an intermediate image. Optionally, the rows of the rotated image may be decimated to match the size of the rows in the intermediate image, with one-dimensional interpolation performed to generate a pixel value in an output row from two or more pixel values in a corresponding input row if necessary. After the intermediate image is generated, one column of pixels in the intermediate image may be rendered at a time, iteratively rendering every column of the intermediate image, to generate an output image. Optionally, the columns of the input intermediate image may be decimated to match the size of the columns in the output image, with one-dimensional interpolation performed to generate a pixel value in an output column from two or more pixel values in the corresponding input column if necessary. Finally, coordinates of a bounding box of the output image may be shifted according to rotation information for the set of input component images.

While embodiments are generally described as processing rows first and then processing columns, columns may be processed first, and then rows. In other words, once an in-plane rotation of a component image is performed, the rotated image is rendered first in one planar (x or y) dimension (whether columns or rows) to generate an intermediate (projected) image, and then the intermediate image is rendered in the other planar dimension to generate an output (projected) image. The output image may then be adjusted on the geometry of the spherical projection by shifting the bounding box of the image.

Figure 1:
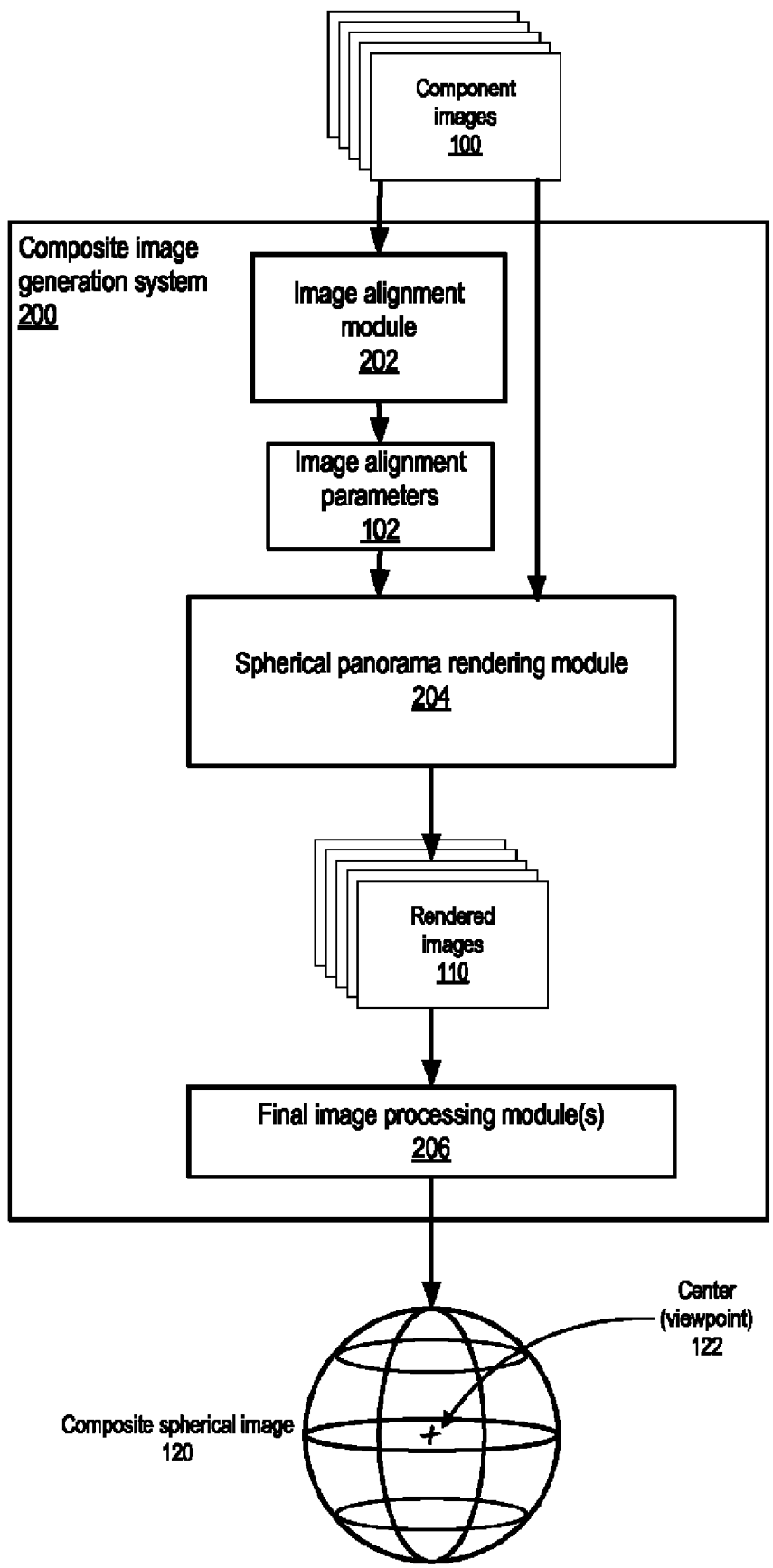
FIG. 1 illustrates an exemplary composite image generation system that includes an exemplary spherical panorama rendering module according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for rendering panoramas under spherical projections are described. Embodiments may provide a computer-implemented method for performing a rendering portion of a process of assembling a single, spherical composite image from multiple potentially overlapping component images. The computer-implemented method for rendering panoramas under spherical projections may be referred to as a spherical panorama rendering algorithm, which may be implemented in software on a computer in a spherical panorama rendering module. The spherical panorama rendering module may be implemented in various computer-implemented image processing applications, programs, or libraries to render panoramas under spherical projections from sets of multiple input or component images. Exemplary software programs in which embodiments may be implemented include, but are not limited to, Adobe Photoshop®, Adobe Photoshop Elements®, and Adobe Photoshop Lightroom®, and Adobe Premiere®.

In one embodiment, the spherical panorama rendering algorithm obtains a set of component digital images and image alignment parameters for the component images. The component digital images may be raw photographs or images taken with a digital still or video camera, images digitized from negatives from a conventional camera, digitized images from scanned photographs, or even synthesized digital images. The component images may be generated, for example, using a camera rotating about a point in order to capture different segments of a spherical view. For example, an individual may generate a first component image (e.g., take a picture) and then move the camera by some amount allowing the user to capture another view of the spherical scene in a second component image, where a portion of the second component image overlaps a portion of the first component image, and so on. The image alignment parameters may include, but are not limited to, focal length, image center, image distortion (if any), and camera orientation for each image. The camera orientation may, for example, be represented as a set of rotation angles (e.g., described by a 3×3 rotation matrix R) from a reference orientation or position.

In one embodiment, the spherical panorama rendering algorithm may decompose the rendering process for each image in the set of component images into multiple stages. Given a rotation matrix R for a component image, R may be decomposed into three rotation matrices. An in-plane rotation of the original image may be performed with any of various in-plane image rotation techniques according to one of the three rotation matrices to generate a rotated image. After the rotated image is generated, one row of pixels in the rotated image may be rendered at a time, iteratively rendering every row of the rotated image, to generate an intermediate image. The dimensions of the intermediate image may be determined by both the dimensions of the input image and the dimensions of the output image along with the alignment parameters. Optionally, the rows of the rotated image may be decimated to match the size of the rows in the intermediate image, with one-dimensional interpolation performed to generate a pixel value in an output row from two or more pixel values in a corresponding input row if necessary. After the intermediate image is generated, one column of pixels in the intermediate image may be rendered at a time, iteratively rendering every column of the intermediate image, to generate an output image. Optionally, the columns of the input intermediate image may be decimated to match the size of the columns in the output image, with one-dimensional interpolation performed to generate a pixel value in an output column from two or more pixel values in the corresponding input column if necessary. Finally, coordinates of a bounding box of the output image may be shifted according to rotation information for the set of input component images.

Rendering one row or one column at a time involves only one-dimensional coordinate transformations and pixel interpolations. Implementations of the spherical panorama rendering algorithm described herein may be more efficient than conventional spherical image rendering techniques, may handle aliasing problems more efficiently than conventional techniques through proper decimation of the intermediate buffers (rows and columns in the second and third stages), and may work well with various interpolation schemes, including complex interpolation schemes such as cubic interpolation, when compared to conventional techniques.

While embodiments are generally described as processing rows first and then processing columns, the two may be reversed in some embodiments, processing columns first and then rows. In other words, once an in-plane rotation of a component image is performed, the rotated image is rendered first in one planar (x or y) dimension (whether columns or rows) to generate an intermediate (projected) image, and then the intermediate image is rendered in the other planar dimension to generate an output (projected) image. The output image may then be adjusted on the geometry of the spherical projection by shifting the bounding box of the image.

The spherical panorama rendering algorithm described herein is fast and produces higher quality images (in terms of aliasing and interpolation) when compared to conventional spherical panorama rendering techniques. An exemplary implementation of the spherical panorama rendering algorithm is described in more detail later in this document.

Figure 9:
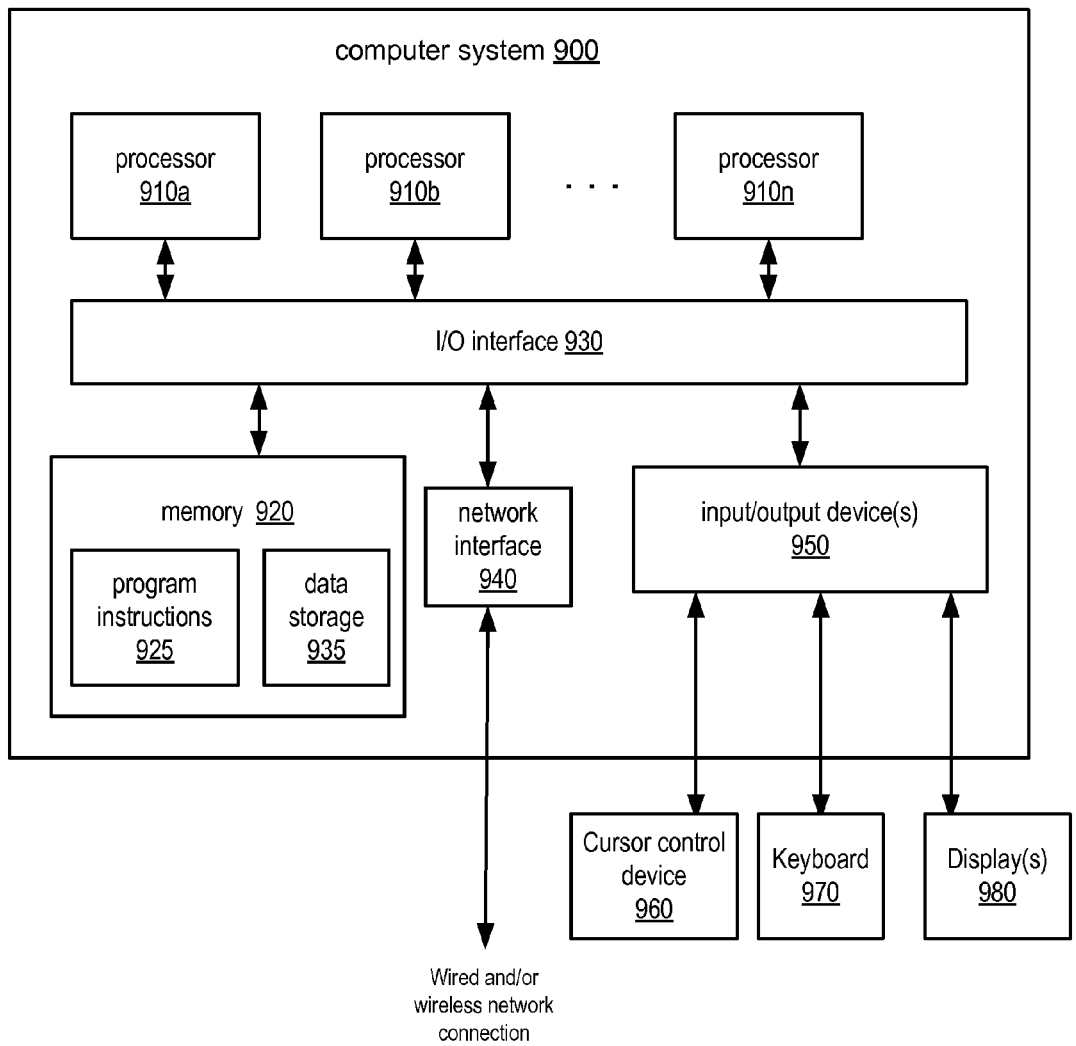
FIG. 9 illustrates an exemplary computer system that may be used in embodiments.

FIG. 1 illustrates an exemplary composite image generation system that includes an exemplary spherical panorama rendering module according to one embodiment. Composite image generation system 200 may be a computer program, application, system or component that may execute on a computer system or combination of two or more computer systems. An exemplary computer system on which composite image generation system 200 may be implemented is illustrated in FIG. 9.

A set of two or more component images 100 may be input into the composite image generation system 200. Image alignment may be performed on all of the component images 100 by an image alignment module 202 to generate image alignment parameters 102. Any of various techniques or combinations thereof may be used by image alignment module 202 to detect the image alignment parameters of the component images 100. Image alignment parameters 102 may include, but are not limited to, the focal length, image center, image distortion (if any), and camera orientation (e.g., described by a 3×3 rotation matrix) for each component image 100.

Once the image alignment parameters 102 are detected, the input component images 100 may be rendered in accordance with the image alignment parameters 102 by spherical panorama rendering module 204 to generate rendered images 110. Operation of spherical panorama rendering module 204 is illustrated in more detail in FIG. 2. Additional image processing, for example blending in overlap regions, may be performed on rendered images 110 by one or more final image processing modules 206 to generate a composite spherical image 120. The spherical image 120 may, for example, be unwrapped to derive a planar composite image, for example to print the composite image. The spherical image 120 may also be viewed on a computer display or on multiple computer displays, for example using a "viewer" that allows the user to pan to view different portions of the spherical image 120. As another example, the spherical image 120 may be projected onto a surface. Center 122 represents the "viewpoint" of a person when viewing the composite spherical image 120, for example as displayed on a computer display, as projected, or as printed output. Rendered images 110 and/or composite spherical image 120 may be stored to a storage device or storage medium in any of various digital image formats.

Figure 2:
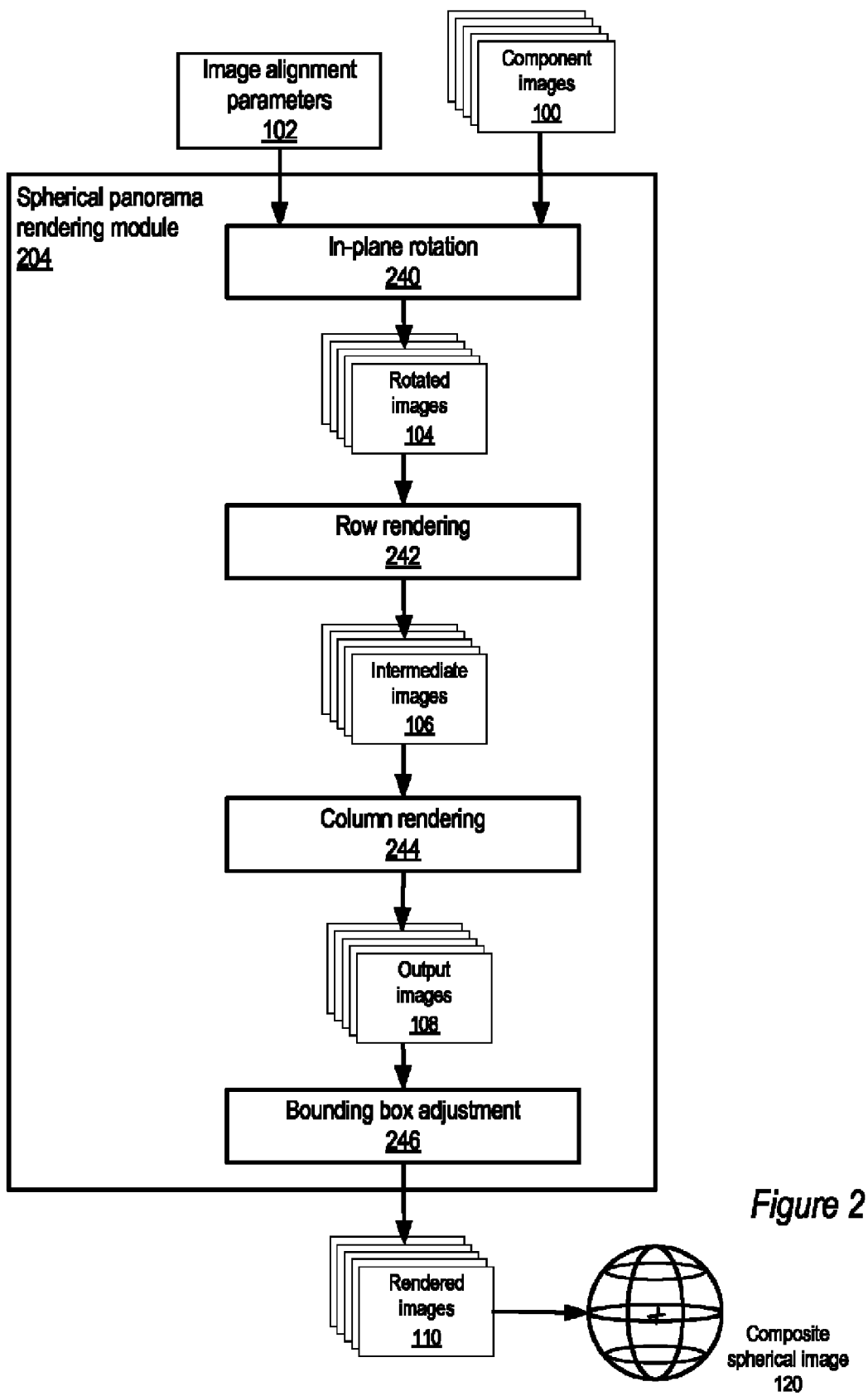
FIG. 2 illustrates an exemplary spherical panorama rendering module according to one embodiment.

FIG. 2 illustrates an exemplary spherical panorama rendering module according to one embodiment. Spherical panorama rendering module 204 obtains a set of component images 100 and image alignment parameters 102 for the component images. The image alignment parameters 102 may include, but are not limited to, focal length, image center, image distortion (if any), and camera orientation for each image. The camera orientation may, for example, be represented as a set of rotation angles (e.g., described by a 3×3 rotation matrix) from a reference orientation or position. In this embodiment, spherical panorama rendering module 204 implements a spherical panorama rendering algorithm that decomposes the rendering process for each image in the set of component images 100 into multiple stages.

A first stage of the spherical panorama rendering module 204 is an in-plane rotation of the original image that may be performed with any of various in-plane image rotation techniques implemented by in-plane rotation 240 component. Note that, while FIG. 2 shows in-plane rotation 240 component as within spherical panorama rendering module 204, in other embodiments, in-plane rotation 240 component may be implemented as a separate, stand-alone module or as a module in another program or library. In-plane rotation 240 component generates rotated images 104, with one rotated image 104 for each input component image 100. In-plane rotation is further illustrated in FIG. 4.

A second stage of the spherical panorama rendering module 204, implemented as row rendering 242 component in FIG. 2, renders one row of pixels in each rotated image 104 at a time, iteratively rendering every row of the rotated image 104, to generate an intermediate image 106 from the rotated image 104. The dimensions of the intermediate image 106 may be determined by both the dimensions of the input image and the dimensions of the output image along with the image alignment parameters 102. Optionally, the rows of the rotated image 104 may be decimated or expanded to match the size (in pixels) of the rows in the intermediate image 106. Row rendering 242 component generates intermediate images 106, with one intermediate image 106 for each input rotated image 104. Row rendering 242 is further illustrated in FIG. 5.

A third stage of the spherical panorama rendering module 204, implemented as column rendering 244 component in FIG. 2, renders one column of pixels in each intermediate image 106 at a time, iteratively rendering every column of the intermediate image 106, to generate an output image 108 from the intermediate image 106. Optionally, the columns of the input intermediate image 106 may be decimated or expanded to match the size (in pixels) of the columns in the output image 108. Column rendering 244 component generates output images 108, with one output image 108 for each input intermediate image 106. Column rendering 244 is further illustrated in FIG. 6.

In one embodiment, in a final step or stage of the spherical panorama rendering process, implemented in FIG. 2 by bounding box adjustment 246 component, coordinates of the bounding boxes of the output images 106 may be shifted according to rotation information for the set of input component images 100 determined in an image alignment process, for example by image alignment 202 module of FIG. 1, to generate rendered images 110. Rendered images 110 and/or composite spherical image 120 may be stored to a storage device or storage medium in any of various digital image formats.

Embodiments of a composite image generation system 200 including a spherical panorama rendering module 204 may determine a projection for a composite spherical image, for example composite spherical image 120 of FIGS. 1 and 2. To assemble a set of component images 100 into a composite spherical image 120, composite image generation system 200 aligns the component images 100 and then projects the images to a spherical surface. The images are aligned, for example, using information associated with the component images 100, e.g., pixel information. Once aligned, the images are projected onto an interior surface of a sphere. The sphere may be defined using, for example, the focal length of the component images and a scaling factor. The scaling factor defines a change in scale for the component image (e.g., larger or smaller) from the original version of the component image to the projected version of the component image.

To determine the location of each component image 100 on the spherical projection surface, a rotation is defined. The rotation may be defined from a particular reference frame (e.g., a spatial position about which the camera is rotated) to preserve the alignment of the component images relative to each other. The rotation of an image may be defined by a rotational matrix R defining a relative orientation between a global reference frame and the reference frame of the image. The rotational matrix defines a system of equations rotating a component image in three dimensions (e.g., a 3×3 matrix) from a reference position in space (e.g., a camera position), such that:

$$R = \begin{bmatrix} R_{11} & R_{12} & R_{13} \\ R_{21} & R_{22} & R_{23} \\ R_{31} & R_{32} & R_{33} \end{bmatrix}$$

Figure 3:
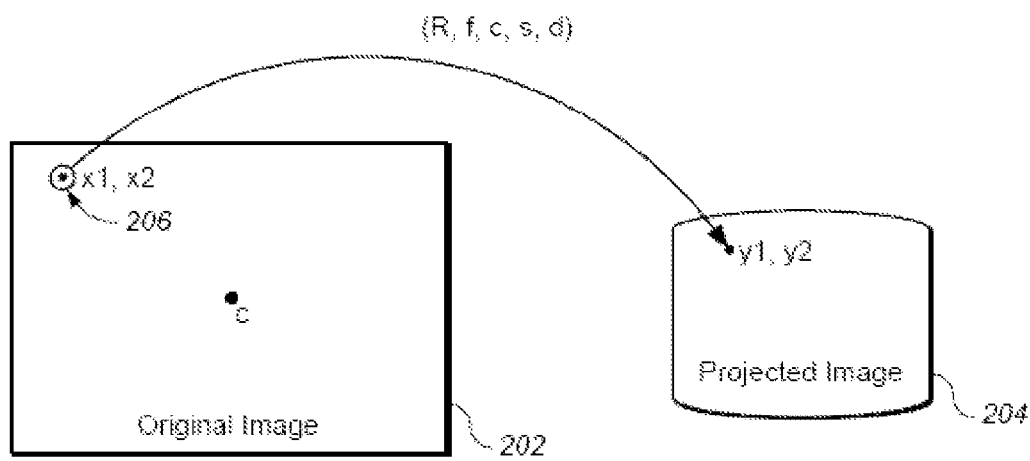
FIG. 3 illustrates an exemplary image projection according to one embodiment.

FIG. 3 illustrates an exemplary image projection according to one embodiment. FIG. 3 shows an original component image 202 and a projected component image 204. A point ($x_1$, $x_2$) in the original image 202 is transformed by the projection into a point ($y_1$, $y_2$) in the projected image 204. For convenience, and throughout this specification, the values $x_1$ and $x_2$ refer to horizontal and vertical coordinates, respectively, in the original component image. Similarly, the values $y_1$ and $y_2$ refer to horizontal and vertical coordinates, respectively, in the projected component image. Determining the point ($y_1$, $y_2$) from a given ($x_1$, $x_2$) is a function of the rotation matrix R, a focal length f, a center c of the original component image, a scale factor s, and a distance d of the particular image from a center image (i.e., a displacement of the particular component image from a center of projection).

The composite image generation system 200 renders a projected composite image (e.g., composite spherical image 120 of FIG. 1). The rendering includes determining the pixel values for the projected composite image. In practice, a projected image is typically constructed according to defined points on a grid such that rendering the image is performed in the opposite manner as described above. Instead, for a given point ($y_1$, $y_2$) on the projected grid, a corresponding point ($x_1$, $x_2$) of a corresponding original component image is identified. Thus, for a known projection (e.g., a known rotational matrix, focal length, scale factor, image center, and distance from the center of projection), any coordinate in the original image can be identified from a corresponding coordinate in the projected image. The pixel values for each point in the projection component image can therefore be rendered using a corresponding pixel value for the identified coordinate in the original component image.

When a scaling between the original and projected component images is involved, and in particular when the projected component image is smaller than the original component image, a single point in the projected component image may correspond to multiple points in the original component image. Thus, in order to determine the pixel value for the point ($y_1$, $y_2$) in the projected component image, the pixel values for a region surrounding the point ($x_1$, $x_2$) may be interpolated (e.g., from region 206 shown in FIG. 3). Any of various techniques may be used to perform interpolation.

The including a spherical panorama rendering module 204 separates the rotational components of the projection. The rotational matrix that describes the rotation of the original component image to a projected component image describes the rotation with respect to three orthogonal axes. Consequently, the rotational matrix can be decomposed into three rotational matrices that describe the rotational effects with respect to the individual axes. Replacing the original matrix with the decomposed rotational matrices in the equations defining the image projection allows the effects along individual axes to be isolated and performed in turn.

Figure 4:
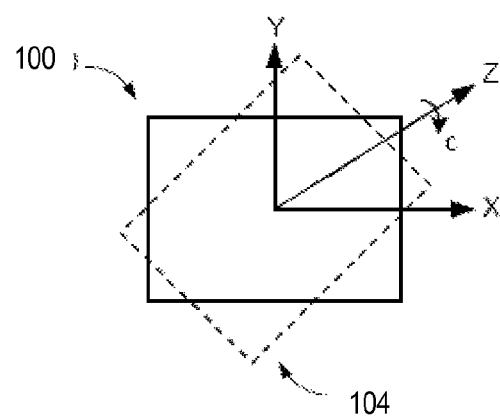
FIG. 4 illustrates in-plane rotation according to one embodiment.

FIG. 4 illustrates in-plane rotation according to one embodiment. In-plane rotation 240 module may rotate the component image 100 by an angle along a first axis orthogonal to the plane of the component image (i.e., the z-axis). This rotation represents an in-plane rotation of the component image. Physically, this is analogous to rotating an image (e.g., clockwise or counterclockwise) that is placed flat on a surface about an axis through the center point of the image. FIG. 4 shows example rotation about a first axis. In FIG. 4, an image 100 is shown with respect to x, y, and z axes, where the x and y axes are in the plane of the image 100 and the z-axis is orthogonal out of the image 100. A rotation of the z axis by an angle c rotates the image within the plane, represented by rotated image 104.

After image rotation of an input component image 100 to produce a rotated image 104 as illustrated in FIGS. 2 and 4, spherical panorama rendering module 204 calculates pixel values in the projected image. Calculating pixel values includes identifying the pixel values with respect to a rotation about a second axis while disregarding any rotation about the third axis. Additionally, the pixel values are calculated by processing each row of the image sequentially followed by each column of the image.

Figure 5:
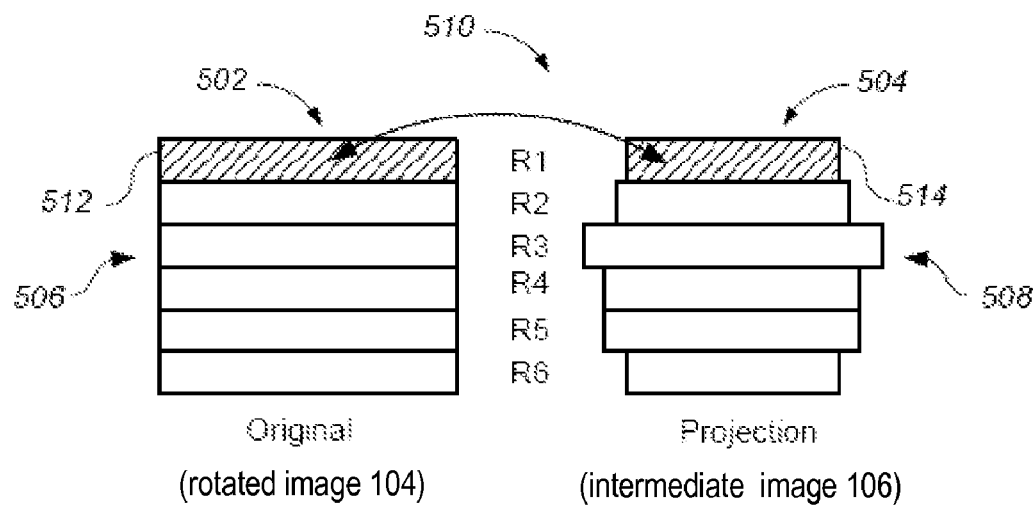
FIG. 5 illustrates an example of rendering image rows independently of image columns according to one embodiment.

FIG. 5 illustrates an example of rendering image rows independently of image columns according to one embodiment. In one embodiment, a row rendering process, for example as implemented by row rendering module 242 of FIG. 2, may calculate the pixel values for each row by looking at each row in isolation. Thus, $y_2$ is held constant for each $y_1$ in the row. By manipulating the projection equations described below, the corresponding set of points ($x_1$, $x_2$) in a corresponding row of the original image (a rotated image 104) can be identified. The pixel value corresponding to each identified ($x_1$, $x_2$) is then used to determine the corresponding pixel value ($y_1$, $y_2$) in the projected image (an intermediate image 106). The pixel value of each point ($y_1$, $y_2$) may be an interpolated value. However, since only the row is being considered, the interpolated value may be assessed based only on row values surrounding the point $x_1$, and not on values of pixels in a two dimensional region. Various interpolation techniques may be used, for example, nearest neighbor interpolation, linear interpolation, and cubic interpolation.

FIG. 5 shows an original component image 502 (a rotated image 104) and a projected component image 504 (an intermediate image 106). The original image 502 is separated into a number of rows 506. Similarly, the projected image 504 is separated into a number of corresponding rows 508. A particular row 512 of the original image 502 corresponds to a row 514 in the projected image 504 according to a transform 510. The transform 510 includes projection properties described herein, but only considering a rotation component along a single axis. Each row 508 in the projected image 504 does not necessarily have a same width as the corresponding row 506 in the original image 502. Additionally, the rows 508 can have different widths depending on where the respective row is located in the image.

Figure 6:
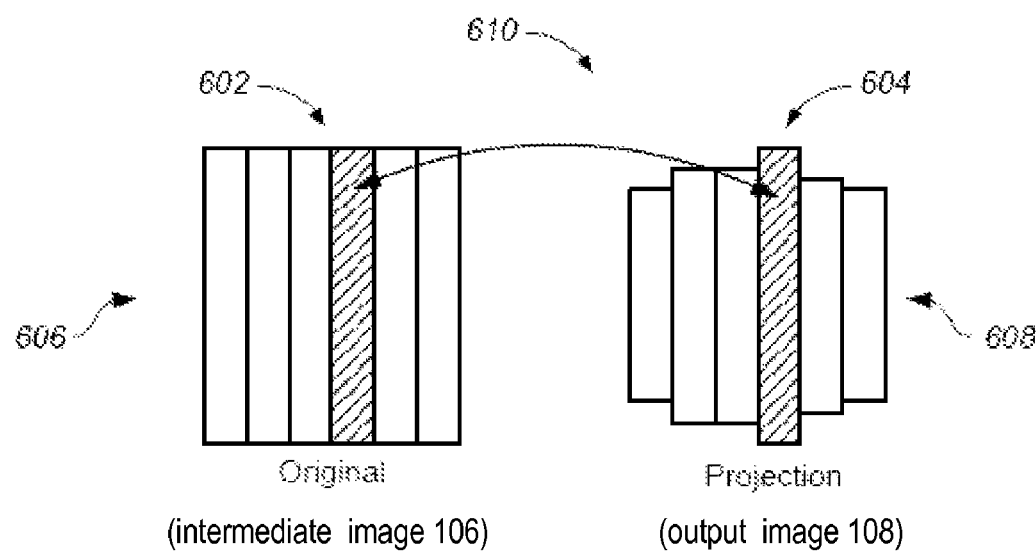
FIG. 6 illustrates an example of rendering image columns independently of image rows according to one embodiment.

FIG. 6 illustrates an example of rendering image columns independently of image rows according to one embodiment. After row rendering of a rotated image 104 to produce an intermediate image 106 as illustrated in FIGS. 2 and 5, in one embodiment, a column rendering process, for example as implemented by column rendering module 244 of FIG. 2, may calculate the pixel values for each column by looking at each column in isolation. Thus, $y_1$ is held constant for each $y_2$ in the column. By manipulating the projection equations described below, the corresponding set of points ($x_1$, $x_2$) in a corresponding column of the original image (an intermediate image 106) may be identified. The pixel value corresponding to each identified ($x_1$, $x_2$) is then used to determine the corresponding pixel value ($y_1$, $y_2$) in the projected image (an output image 108). The pixel value of each point ($y_1$, $y_2$) may be an interpolated value. However, since only the column is being considered, the interpolated value may be assessed based only on column values surrounding the point $x_2$, and not on values of pixels in a two dimensional region. As with the rows, various interpolation techniques can be used, for example, nearest neighbor interpolation, linear interpolation, and cubic interpolation.

FIG. 6 shows an original component image 602 (an intermediate image 106) and a projected component image 604 (an output image 108). The original image 602 is separated into a number of columns 606. Similarly, the projected image 604 is separated into a number of corresponding columns 608. A particular column 612 of the original image 602 corresponds to a column 614 in the projected image 604 according to a transform 610. The transform 610 includes projection properties described herein, but only considering a rotation component along a single axis. Similar to FIG. 5, each column 608 in the projected image 604 does not necessarily have a same height as the corresponding column 606 in the original image 602. Additionally, the columns 608 of the projected image 604 may have different heights.

In some implementations, aliasing resulting from image scaling may be reduced using a decimation process (e.g., when the original image is at least twice the size of the projected image). In the decimating process, when computing values for a row (or a column) in the projected image, the corresponding row of the original image may be down-sampled. The row of the original image may be down-sampled to a size comparable to the size of the row in the projected image. For example, given a row in an original image has 1000 pixels and a known output row size of 201 pixels, the row in the original image may be down-sampled to 201 pixels. In one embodiment, the down-sampling may be performed using a box-filter, which reduces aliasing effects. Other embodiments may use other methods or techniques to perform down-sampling. A similar process may be applied when computing values for each column in the projected image.

Spherical panorama rendering module 204 rotates the image by an angle along a third axis (e.g., the y-axis) corresponding to a position shift along the projected surface (e.g., along the interior surface of a sphere). More specifically, if the y-axis represents a vertical axis through the camera position, a rotation about y is analogous to the change in the view resulting from rotating the camera about that axis. In some implementations, with respect to the image projection, this rotation may be represented by a shift in the bounding box of the component image. Thus, the shift caused by the rotation does not effect the previous rotation and pixel value calculations for the projected image.

In an alternative implementation, the final rotation may be applied such that the component image is rendered into the correct location on the sphere. For example, a temporary buffer may be used to store a copy of the calculated position information. The component image may then be rendered into the shifted position directly using the buffered data, instead of shifting the image after rendering. Following this last rotation, the image has been completely rendered. Each component image is similarly rendered by separating out the rendering operation into discrete operations with respect to individual axes in order to render a composite image.

Figure 7:
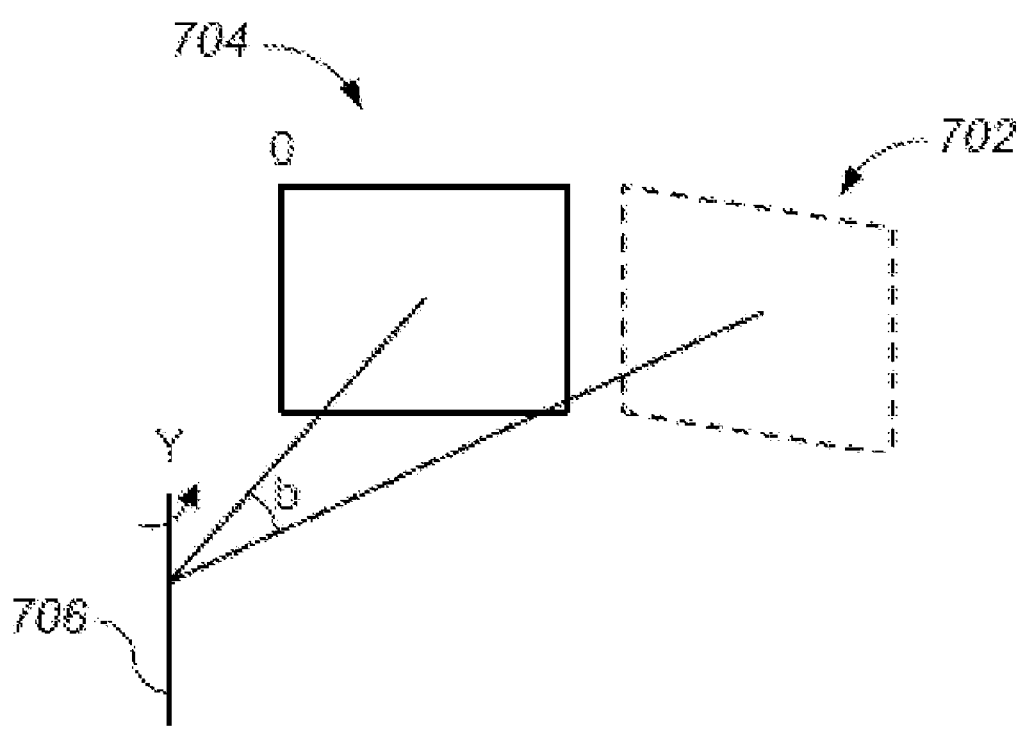
FIG. 7 illustrates an example rotation about a third axis according to one embodiment.

FIG. 7 illustrates an example rotation about a third axis (e.g., the y-axis) according to one embodiment. In FIG. 7, first projected image 702 is shown prior to the rotation about the y-axis 706. A second projected image 704 shows the same projected image following a rotation about the y-axis 706 by an angle b. The coordinates of the bounding box for the first and second projected images 702 and 704 have been adjusted to correspond to the shift in position along the projection surface.

Spherical Panorama Rendering Algorithm

The following describes an exemplary implementation of the spherical panorama rendering algorithm according to one embodiment that may be implemented in or by a spherical panorama rendering module, for example spherical panorama rendering module 204 of FIGS. 1 and 2. Embodiments of the spherical panorama rendering algorithm render panoramas under spherical projections. A set of input component images whose image alignment information has already been computed, for example by an image alignment module or component of a panoramic image processing application or library, is assumed. From the image alignment information, the focal length, image center, image distortion (if any), and camera orientation (e.g., described by a 3×3 rotation matrix) for each component image may be determined. The desired output scaling and position information may also be assumed to be known.

Sections of the following description of the spherical panorama rendering algorithm are numbered from 1 to 6 in order to more easily summarize the algorithm below.

Section 1

Given a rotation matrix R, R may be decomposed into three rotation matrices as follows:

$$R = R_b \cdot R_a \cdot R_c$$

where $R_a$ is a rotation around the x-axis, $R_b$ is a rotation around the y-axis and $R_c$ is a rotation around the z-axis. Mathematically, this means:

$$R_a = \begin{bmatrix} 1 & 0 & 0 \\ 0 & \cos a & \sin a \\ 0 & -\sin a & \cos a \end{bmatrix}$$

$$R_b = \begin{bmatrix} \cos b & 0 & \sin b \\ 0 & 1 & 0 \\ -\sin b & 0 & \cos b \end{bmatrix}$$

$$R_c = \begin{bmatrix} \cos c & \sin c & 0 \\ -\sin c & \cos c & 0 \\ 0 & 0 & 1 \end{bmatrix}$$

where a, b, and c are real numbers. A method to find (a, b, c) for a given R is given below. First, it is noted that:

$$R = \begin{bmatrix} \cos b \cos c + \sin b \sin a \sin c & \cos b \sin c - \sin b \sin a \cos c & \sin b \cos a \\ -\cos a \sin c & \cos a \cos c & \sin a \\ -\sin b \cos c + \cos b \sin a \sin c & -\sin b \sin c - \cos b \sin a \cos c & \cos b \cos a \end{bmatrix}$$

It follows that:

$$b = \arctan2(R_{13}, R_{33})$$

$$c = \arctan2(-R_{21}, R_{22})$$

$$a = \arctan2\left(R_{23}, \frac{(R_{13} + R_{33})}{(\sin b + \cos b)}\right)$$

Section 2

It is further required that:

$$\frac{-\pi}{2} \leq a \leq \frac{\pi}{2}$$

This requirement may be accomplished by the following:

if $\left(a > \frac{\pi}{2}\right)$ $b = \pi + b$ $a = \pi - a$ $c = \pi + c$ else if $\left(a < \frac{-\pi}{2}\right)$ $b = \pi + b$ $a = -\pi - a$ $c = \pi + c$ Section 3

The forward projection process is addressed. Given a point x in the input image, its position in the output image may be calculated by:

$$X = \begin{bmatrix} (x_1 - c_1)/f \\ (x_2 - c_2)/f \\ 1 \end{bmatrix} \quad \text{(Formula 4)}$$

$$Y = RX \quad \text{(Formula 5)}$$

$$y = \begin{bmatrix} \arctan2(y_1, y_3) \cdot s_1 + d_1 \\ \arctan2\left(y_2, \sqrt{y_1^2 + y_3^2}\right) \cdot s_2 + d_2 \end{bmatrix} \quad \text{(Formula 6)}$$

As noted above, $R = R_b \cdot R_a \cdot R_c$. It is noted that:

$$R_c \cdot \begin{bmatrix} (x_1 - c_1)/f \\ (x_2 - c_2)/f \\ 1 \end{bmatrix} = \begin{bmatrix} (\cos c(x_1 - c_1) + \sin c(x_2 - c_2))/f \\ (-\sin c(x_1 - c_1) + \cos c(x_2 - c_2))/f \\ 1 \end{bmatrix}$$

In other words, this step may be performed by rotating the image by an angle c.

Section 4

If the following is denoted:

$$Z = \begin{bmatrix} Z_1 \\ Z_2 \\ Z_3 \end{bmatrix}$$

with:

$$R_a R_c \cdot \begin{bmatrix} (x_1 - c_1)/f \\ (x_2 - c_2)/f \\ 1 \end{bmatrix}$$

and the combined effect of equations (4-6) is examined:

$$Y = \begin{bmatrix} \cos b Z_1 + \sin b Z_3 \\ Z_2 \\ -\sin b Z_1 + \cos b Z_3 \end{bmatrix}$$

and $$x = \begin{bmatrix} s_1 \arctan2(\cos b Z_1 + \sin b Z_3, -\sin b Z_1 + \cos b Z_3) + d_1 \\ s_2 \arctan2\left(Z_2, \sqrt{(\cos b Z_1 + \sin b Z_3)^2 + (-\sin b Z_1 + \cos b Z_3)^2}\right) + d_2 \end{bmatrix} =$$

$$\begin{bmatrix} s_1(\arctan2(Z_1, Z_3) + b) + d_1 \\ s_2 \arctan2\left(Z_2, \sqrt{Z_1^2 + Z_3^2}\right) + d_2 \end{bmatrix}$$

In other words, the effect of $R_b$ is only to offset the image along the first axis by $s_1 b$, which can be easily done with a change in the bounding box of the pixel data.

Section 5

The following is denoted:

$$z = \begin{bmatrix} z_1 \\ z_2 \end{bmatrix} = \begin{bmatrix} \cos c(x_1 - c_1) + \sin c(x_2 - c_2) \\ -\sin c(x_1 - c_1) + \cos c(x_2 - c_2) \end{bmatrix}$$

and the combined effect of equations (4-6) are examined after removing $R_b$, as that may be handled, e.g. by changing or shifting the bounding box of the pixel data:

$$x = \begin{bmatrix} s_1 \arctan2(z_1/f, \cos(a) - \sin a z_2/f) + d_1 \\ s_2 \arctan2\left(\cos a z_2/f + \sin a, \sqrt{(z_1/f)^2 + (\cos a - \sin a z_2/f)^2}\right) + d_2 \end{bmatrix}$$

The computation of x may be separated into two steps, as shown in 5.1 and 5.2.

Section 5.1

$$w = \begin{bmatrix} \arctan2(z_1/f, \cos(a) - \sin a z_2/f) \\ z_2 \end{bmatrix}$$

In this computation, $z_2$ is fixed from z to w. Therefore, each row of the image can be computed separately. Given $w_1$, $z_1$ (or $x_1$) can be found by:

$z_1 = (\cos a - \sin a z_2/f) \tan(w_1) f$ $x_1 = (\cos a - \sin a z_2/f) \tan(w_1) f + c_2$ Section 5.2

$$x = \begin{bmatrix} w_1 \\ \arctan2(\cos a w_2/f + \sin a, (\cos a - \sin a w_2/f)|\cos w_1|) \end{bmatrix}$$

if $(\cos a - \sin a \, w_2/f) >= 0$.

In this computation, $w_1$ is fixed from w to x. Therefore, each column of the image can be computed separately. Given $x_2$ and $w_1$, $z_2$ (or $w_2$, $x_2$) can be found by:

$$z_2 = w_2 = \frac{\tan(x_2) \cdot |\cos(w_1)| \cdot \cos a - \sin a}{\cos a + \tan(x_2) \cdot |\cos(w_1)|} \cdot f$$

$$x_2 = \frac{\tan(x_2) \cdot |\cos(w_1)| \cdot \cos a - \sin a}{\cos a + \tan(x_2) \cdot |\cos(w_1)|} \cdot f + c_2$$

Section 6

In one embodiment, to handle aliasing, which may occur when rendering a large image into a small image, sections 5.1 and 5.2 may be modified to perform decimation of the original rows and columns, respectively, before projecting the original rows and columns into the projected image, as previously described. The rows and columns may be decimated such that the size of the decimated rows and columns match the size of the rows and columns in the projected image. Interpolation may be performed to determine a pixel value in the projected image from two or more pixel values in the original image, if necessary. Various interpolation techniques may be used, for example, nearest neighbor interpolation, linear interpolation, and cubic interpolation. Note that interpolation may be performed in one dimension, since a one-dimensional row or column of pixels is being interpolated into a one-dimensional row or column in the projected image. In one embodiment, a simple summation and normalization of pixel values from the input row or column may be performed to determine a pixel value in a projected row or column.

Figure 8:
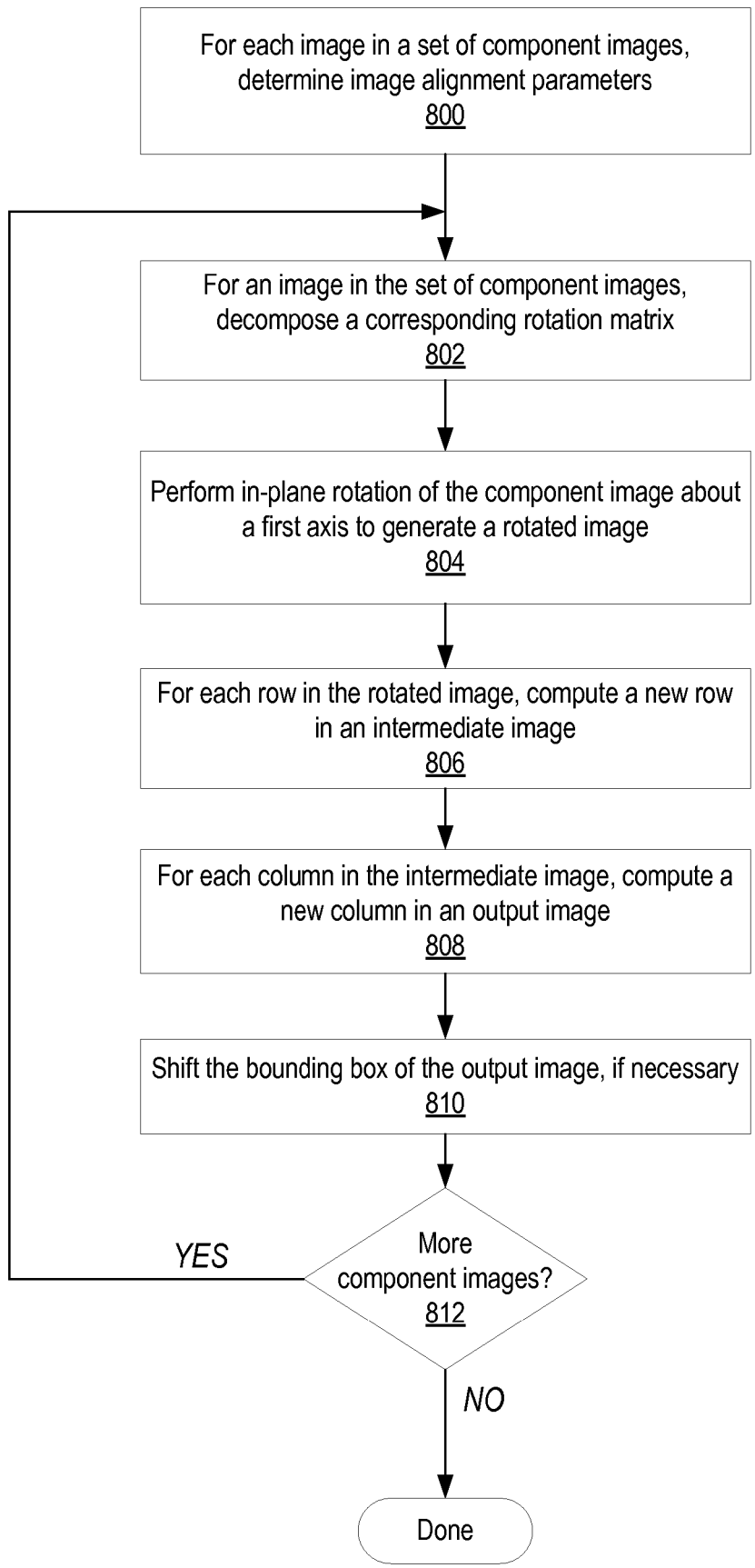
FIG. 8 illustrates a flowchart of a method for rendering panoramas under spherical projections according to one embodiment.

FIG. 8 illustrates a flowchart of a method for rendering panoramas under spherical projections according to one embodiment. As indicated at 800, for each image in a set of component images, image alignment parameters are determined. Image alignment parameters may be determined, for example, by an image alignment module 202 of a composite image generation system as illustrated in FIG. 1.

Elements 802 through 812 illustrate an implementation of the spherical panorama rendering algorithm according to one embodiment. The spherical panorama rendering algorithm may be implemented, for example, in a spherical panorama rendering module 204 as illustrated in FIGS. 1 and 2. Elements 802 through 810 are performed for each component image in a set of component images 100 to render a panorama under a spherical projection from the component images 100 and the image alignment parameters for the component images determined at 800.

As indicated at 802, given a rotation matrix R of a component image, R is decomposed into components (a,b,c) according to Sections 1 and 2.

As indicated at 804, an in-plane rotation of the image by c is performed according to Section 3 to generate a rotated image. In one embodiment, the spherical panorama rendering algorithm may use an implementation of an image rotation technique which can be implemented efficiently in two passes.

As indicated at 806, for each row in the rotated image, a new row is computed in an intermediate image according to Section 5.1, with optional decimation according to Section 6 if necessary. This generates an intermediate image.

As indicated at 808, for each column in the intermediate image, a new column is computed in an output image according to Section 5.2, with optional decimation according to Section 6 if necessary. This generates an output image. Note that the pixel values in this output image are the final pixel values.

As indicated at 810, the bounding box of the output image may be shifted, if necessary, according to Section 4.

As indicated at 812, if there is another component image not yet rendered according to elements 802 through 810, the method returns to 802. Otherwise, if all component images have been rendered, the method is done. Thus, elements 802 through 810 are performed for each component image in the set of component images to generate a composite spherical image from the set of component images.

While the method described in FIG. 8 describes an embodiment in which an element 806 processes rows and an element 808 processes columns, indicating that row processing is performed before column processing, in an alternate embodiment, column processing may be performed before row processing. In other words, once the component image is rotated according to element 804, the rotated image is rendered first for each element (whether columns or rows) of pixels in one planar (x or y) dimension to generate pixel values in a corresponding element (column or row) of an intermediate (projected) image, and then the intermediate image is rendered for each element in the other planar dimension to generate pixel values in an output (projected) image. The output image may then be adjusted on the geometry of the spherical projection by shifting the bounding box of the image.

Exemplary System

Various components of embodiments of a spherical panorama rendering algorithm may be executed on one or more computer systems, which may interact with various other devices. One such computer system is illustrated by FIG. 9. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, audio device 990, and display(s) 980. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions and/or data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a spherical panorama rendering algorithm, are shown stored within system memory 920 as program instructions 925 and data storage 935, respectively. Data storage 925 may include, but is not limited to, output data of spherical panorama rendering algorithm including, but not limited to, rendered images 110 and/or composite spherical image 120, which may be stored in one or more of various image file formats in memory 920. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930.

Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, configured to implement embodiments of a spherical panorama rendering algorithm as described herein, and data storage 935, comprising various data accessible by program instructions 925. In one embodiment, program instructions 925 may include software elements of a spherical panorama rendering algorithm as illustrated in the above Figures. Data storage 935 may include data that may be used in embodiments. In other embodiments, other or different software elements and data may be included.

Those skilled in the art will appreciate that computer system 900 is merely illustrative and is not intended to limit the scope of a spherical panorama rendering algorithm as described herein. In particular, the computer system and devices may include any combination of hardware or software that can perform the indicated functions, including computers, network devices, internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method for rendering a spherical composite image from multiple component images, comprising:
performing, by one or more computer processors:
obtaining a set of component images and alignment information for each component image in the set of component images, wherein the alignment information includes three-dimensional (3D) rotation information relative to a reference position for the set of composite images;
for each component image in the set of component images:
decomposing respective 3D rotation information for the component image into three rotation matrices each describing rotation with respect to one of the x axis, the y axis, and the z axis;
performing an in-plane rotation of the component image according to one of the three rotation matrices to generate a rotated image with respect to the axis corresponding to the one of the three rotation matrices;
generating an intermediate image by rendering each element in a first planar dimension of the rotated image to generate pixel values in a corresponding element in the first planar dimension of the intermediate image;
generating an output image by rendering each element in a second planar dimension of the intermediate image to generate pixel values in a corresponding element in the second planar dimension of the output image; and
adjusting coordinates indicated in a bounding box of the output image according to the alignment information for the component image to position the output image on an interior surface of a sphere.

2. The computer-implemented method as recited in claim 1, wherein the elements in the first planar dimension are rows, and wherein the elements in the second planar dimension are columns.

3. The computer-implemented method as recited in claim 1, wherein said rendering each element in a first planar dimension of the rotated image to generate pixel values in a corresponding element in the first planar dimension of the intermediate image comprises decimating each element of the rotated image to match the size of a corresponding element in the intermediate image.

4. The computer-implemented method as recited in claim 3, wherein said decimating comprises performing interpolation of two or more pixel values from the element in the rotated image to generate a single pixel value in the decimated element.

5. The computer-implemented method as recited in claim 1, wherein said rendering each element in a first planar dimension of the rotated image to generate pixel values in a corresponding element in the first planar dimension of the intermediate image comprises performing interpolation of two or more pixel values from the element in the rotated image to generate a single pixel value in the corresponding element in the intermediate image.

6. The computer-implemented method as recited in claim 1, wherein said rendering each element in a second planar dimension of the intermediate image to generate pixel values in a corresponding element in the second planar dimension of the output image comprises decimating each element of the intermediate image to match the size of a corresponding element in the output image.

7. The computer-implemented method as recited in claim 6, wherein said decimating comprises performing interpolation of two or more pixel values from the element in the intermediate image to generate a single pixel value in the decimated element.

8. The computer-implemented method as recited in claim 1, wherein said rendering each element in a second planar dimension of the intermediate image to generate pixel values in a corresponding element in the second planar dimension of the output image comprises performing interpolation of two or more pixel values from the element in the intermediate image to generate a single pixel value in the corresponding element in the output image.

9. A system, comprising:
at least one processor; and
a memory comprising program instructions, wherein the program instructions are executable by the at least one processor to implement a spherical panorama rendering module configured to, for each component image in a set of component images:
decompose respective three-dimensional (3D) rotation information corresponding to the component image and relative to a reference position for the set of composite images into three rotation matrices each describing rotation with respect to one of the x axis, the y axis, and the z axis;
perform an in-plane rotation of the component image according to one of the three rotation matrices to generate a rotated image with respect to the axis corresponding to the one of the three rotation matrices;
generate an intermediate image by rendering each element in a first planar dimension of the rotated image to generate pixel values in a corresponding element in the first planar dimension of the intermediate image;
generate an output image by rendering each element in a second planar dimension of the intermediate image to generate pixel values in a corresponding element in the second planar dimension of the output image; and
adjust coordinates indicated in a bounding box of the output image according to alignment information for the component image to position the output image on an interior surface of a sphere.

10. The system as recited in claim 9, wherein the elements in the first planar dimension are rows, and wherein the elements in the second planar dimension are columns.

11. The system as recited in claim 9, wherein, to render each element in a first planar dimension of the rotated image to generate pixel values in a corresponding element in the first planar dimension of the intermediate image, the spherical panorama rendering module is configured to decimate each element of the rotated image to match the size of a corresponding element in the intermediate image.

12. The system as recited in claim 9, wherein, to render each element in a first planar dimension of the rotated image to generate pixel values in a corresponding element in the first planar dimension of the intermediate image, the spherical panorama rendering module is configured to perform interpolation of two or more pixel values from the element in the rotated image to generate a single pixel value in the corresponding element in the intermediate image.

13. The system as recited in claim 9, wherein, to render each element in a second planar dimension of the intermediate image to generate pixel values in a corresponding element in the second planar dimension of the output image, the spherical panorama rendering module is configured to decimate each element of the intermediate image to match the size of a corresponding element in the output image.

14. The system as recited in claim 9, wherein, to render each element in a second planar dimension of the intermediate image to generate pixel values in a corresponding element in the second planar dimension of the output image, the spherical panorama rendering module is configured to perform interpolation of two or more pixel values from the element in the intermediate image to generate a single pixel value in the corresponding element in the output image.

15. A non-transitory computer-readable storage medium storing program instructions, wherein the program instructions are computer-executable to implement:
  obtaining a set of component images and alignment information for each component image in the set of component images, wherein the alignment information includes three-dimensional (3D) rotation information relative to a reference position for the set of composite images;
  for each component image in the set of component images:
    decomposing respective 3D rotation information for the component image into three rotation matrices each describing rotation with respect to one of the x axis, the y axis, and the z axis;
    performing an in-plane rotation of the component image according to one of the three rotation matrices to generate a rotated image with respect to the axis corresponding to the one of the three rotation matrices;
    generating an intermediate image by rendering each element in a first planar dimension of the rotated image to generate pixel values in a corresponding element in the first planar dimension of the intermediate image;
    generating an output image by rendering each element in a second planar dimension of the intermediate image to generate pixel values in a corresponding element in the second planar dimension of the output image; and
    adjusting coordinates indicated in a bounding box of the output image according to the alignment information for the component image to position the output image on an interior surface of a sphere.

16. The non-transitory computer-readable storage medium as recited in claim 15, wherein the elements in the first planar dimension are rows, and wherein the elements in the second planar dimension are columns.

17. The non-transitory computer-readable storage medium as recited in claim 15, wherein, in said rendering each element in a first planar dimension of the rotated image to generate pixel values in a corresponding element in the first planar dimension of the intermediate image, the program instructions are computer-executable to implement decimating each element of the rotated image to match the size of a corresponding element in the intermediate image.

18. The non-transitory computer-readable storage medium as recited in claim 15, wherein, in said rendering each element in a first planar dimension of the rotated image to generate pixel values in a corresponding element in the first planar dimension of the intermediate image, the program instructions are computer-executable to implement performing interpolation of two or more pixel values from the element in the rotated image to generate a single pixel value in the corresponding element in the intermediate image.

19. The non-transitory computer-readable storage medium as recited in claim 15, wherein, in said rendering each element in a second planar dimension of the intermediate image to generate pixel values in a corresponding element in the second planar dimension of the output image, the program instructions are computer-executable to implement decimating each element of the intermediate image to match the size of a corresponding element in the output image.

20. The non-transitory computer-readable storage medium as recited in claim 15, wherein, in said rendering each element in a second planar dimension of the intermediate image to generate pixel values in a corresponding element in the second planar dimension of the output image, the program instructions are computer-executable to implement performing interpolation of two or more pixel values from the element in the intermediate image to generate a single pixel value in the corresponding element in the output image.

* * * * *